(12) United States Patent
Bae (10) Patent No.: US 11,942,660 B2
(45) Date of Patent: Mar. 26, 2024

(54) BATTERY PACK

(71) Applicant: Samsung SDI Co., Ltd., Yongin-si (KR)

(72) Inventor: Sanghoon Bae, Yongin-si (KR)

(73) Assignee: Samsung SDI Co., Ltd.

( * ) Notice: Subject to any disclaimer, the term of this patent is extended or adjusted under 35 U.S.C. 154(b) by 700 days.

(21) Appl. No.: 16/966,174

(22) PCT Filed: Oct. 18, 2018

(86) PCT No.: PCT/KR2018/012338
§ 371 (c)(1),
(2) Date: Jul. 30, 2020

(87) PCT Pub. No.: WO2019/151609
PCT Pub. Date: Aug. 8, 2019

(65) Prior Publication Data
US 2021/0036300 A1 Feb. 4, 2021

(30) Foreign Application Priority Data
Jan. 31, 2018 (KR) .......................... 10-2018-0012424

(51) Int. Cl.
*H01M 50/531* (2021.01)
*H01M 50/213* (2021.01)
(Continued)

(52) U.S. Cl.
CPC ....... *H01M 50/531* (2021.01); *H01M 50/213* (2021.01); *H01M 50/50* (2021.01); *H01M 50/548* (2021.01); *H01M 50/583* (2021.01)

(58) Field of Classification Search
CPC .. H01M 50/531; H01M 50/213; H01M 50/50; H01M 50/548; H01M 50/583;
(Continued)

(56) References Cited

U.S. PATENT DOCUMENTS 9,722,230 B2  8/2017  Fujiwara et al.
9,754,754 B2  9/2017  Kawase et al.
(Continued)

FOREIGN PATENT DOCUMENTS

CN  104981888  10/2015
CN  205211838  5/2016
(Continued)

OTHER PUBLICATIONS

International Search Report dated Apr. 1, 2019, in International Application No. PCT/KR2018/012338 (with English Translation).
(Continued)

*Primary Examiner* — Christian Roldan
(74) *Attorney, Agent, or Firm* — H.C. Park & Associates, PLC (57) ABSTRACT

A battery pack includes: a plurality of bare cells including an electrode terminal at both ends thereof; and an electrode tab arranged at each of the both ends to electrically connect adjacent bare cells to each other, wherein the electrode tab includes: a plate including a plurality of opening portions formed corresponding respectively to the plurality of bare cells; a plurality of fuse portions extending from one edge of the plurality of opening portions into the plurality of opening portions; and a plurality of coupling portions bent from the plurality of fuse portions, arranged at a center portion of the plurality of opening portions, and coupled to the electrode terminal.

9 Claims, 5 Drawing Sheets

(51) Int. Cl.
*H01M 50/50* (2021.01)
*H01M 50/548* (2021.01)
*H01M 50/583* (2021.01)

(58) Field of Classification Search
CPC ............. H01M 50/503; H01M 50/516; H01M 50/528; H01M 50/566; H01M 50/581; H01M 2200/103; H01M 50/20; H01M 50/502; Y02E 60/10
USPC ......................................................... 429/163
See application file for complete search history.

(56) References Cited

U.S. PATENT DOCUMENTS

| | | | | |
|---|---|---|---|---|
| 2005/0031945 | A1* | 2/2005 | Morita | H01M 50/503 429/158 |
| 2010/0159289 | A1 | 6/2010 | Kim et al. | |
| 2011/0104958 | A1* | 5/2011 | Kwon | H01R 13/2464 439/816 |
| 2013/0202941 | A1* | 8/2013 | Ono | H01H 85/12 29/623 |
| 2015/0180093 | A1 | 6/2015 | Han et al. | |
| 2015/0380713 | A1* | 12/2015 | Kimura | H01H 37/32 429/121 |
| 2016/0073506 | A1 | 3/2016 | Coakley et al. | |
| 2016/0141573 | A1 | 5/2016 | Aoki et al. | |
| 2016/0181579 | A1* | 6/2016 | Geshi | H01M 50/581 429/61 |
| 2016/0260950 | A1 | 9/2016 | Baek et al. | |
| 2017/0048978 | A1 | 2/2017 | Fees et al. | |
| 2017/0214033 | A1* | 7/2017 | Takano | H01M 50/522 |

FOREIGN PATENT DOCUMENTS

| | | |
|---|---|---|
| JP | 5328459 | 10/2010 |
| JP | 5672294 | 2/2015 |
| JP | 5955695 | 7/2016 |
| KR | 10-2009-0030711 | 3/2009 |
| KR | 10-2011-0003896 | 1/2011 |
| KR | 10-2011-0059252 | 6/2011 |
| KR | 10-1281045 | 7/2013 |
| KR | 10-2015-0143461 | 12/2015 |
| KR | 10-2016-0107798 | 9/2016 |

OTHER PUBLICATIONS

Office Action dated Feb. 28, 2022, issued to Chinese Patent Application No. 201880083492.1.

European Search Report dated Sep. 27, 2021, issued to European Patent Application No. 18903478.8.

Office Action dated Nov. 7, 2022, issued to CN Patent Application No. 201880083492.1.

* cited by examiner

BATTERY PACK

CROSS-REFERENCE TO RELATED APPLICATIONS

This application is the National Stage Entry of International Patent Application No. PCT/KR2018/012338, filed on Oct. 18, 2018, and claims priority from and the benefit of Korean Patent Application No. 10-2018-0012424, filed on Jan. 31, 2018, each of which is hereby incorporated by reference for all purposes as if fully set forth herein.

BACKGROUND

Field

Exemplary embodiments of the present disclosure relate to battery packs, and more particularly, to a battery pack capable of improving the stability thereof by minimizing the influence between adjacent battery cells.

Discussion of the Background

Recently, with the rapid development of electronics and communications industries, mobile electronic devices such as cellular phones, notebook computers, camcorders, and personal digital assistants (PDAs) have been increasingly popularized. As the power supply of mobile electronic devices, secondary batteries that are rechargeable have been widely used in consideration of economical efficiency.

Various types of secondary batteries such as nickel-cadmium batteries, lead batteries, nickel-hydrogen batteries, lithium ion batteries, and lithium polymer batteries have been developed. Such secondary batteries may be combined with a circuit to constitute a battery module and may be charged/discharged through an external terminal of the battery module.

Meanwhile, when a relatively high-output large current is required as in electric vehicles, electric bicycles, electric tools, or the like, a battery pack including a plurality of secondary batteries may be used as a power supply. The secondary batteries may be electrically connected by using a connection member such as a lead or a tab, and in this case, when a short circuit occurs in any one of the secondary batteries, an overcurrent may flow into other secondary batteries and thus the battery pack may be burst or devices receiving power from the battery pack may be damaged.

SUMMARY

The present disclosure is to solve several problems including the above problems and is to provide a battery pack capable of improving the stability thereof by minimizing the influence between adjacent battery cells. However, these problems are merely examples and the scope of the present disclosure is not limited thereto.

Embodiments of the present disclosure are to provide battery packs.

According to an aspect of the present disclosure, a battery pack includes: a plurality of bare cells including an electrode terminal at both ends thereof; and an electrode tab arranged at each of the both ends to electrically connect adjacent bare cells to each other, wherein the electrode tab includes: a plate including a plurality of opening portions formed corresponding respectively to the plurality of bare cells; a plurality of fuse portions extending from one edge of the plurality of opening portions into the plurality of opening portions; and a plurality of coupling portions bent from the plurality of fuse portions, arranged at a center portion of the plurality of opening portions, and coupled to the electrode terminal.

According to an embodiment of the present disclosure described above, the stability of the battery pack may be improved by minimizing the influence between adjacent battery cells.

Also, the risk of deformation or breakage of components may be reduced when the battery pack is transported or assembled.

However, the scope of the present disclosure is not limited to these effects.

DETAILED DESCRIPTION

According to an aspect of the present disclosure, a battery pack includes: a plurality of bare cells including an electrode terminal at both ends thereof; and an electrode tab arranged at each of the both ends to electrically connect adjacent bare cells to each other, wherein the electrode tab includes: a plate including a plurality of opening portions formed corresponding respectively to the plurality of bare cells; a plurality of fuse portions extending from one edge of the plurality of opening portions into the plurality of opening portions; and a plurality of coupling portions bent from the plurality of fuse portions, arranged at a center portion of the plurality of opening portions, and coupled to the electrode terminal.

The plurality of coupling portions may include a welding region welded to the electrode terminal and a connection region bent from the plurality of fuse portions and connected to the welding region.

A height of the welding region from the electrode terminal may be smaller than a height of the plate from the electrode terminal.

A height of the welding region from the electrode terminal may be smaller than a height of the plurality of fuse portions from the electrode terminal.

The plurality of opening portions may be arranged in a line in a first direction, and the plurality of fuse portions may extend in a second direction intersecting the first direction.

The second direction may be perpendicular to the first direction.

The plurality of fuse portions may be fused by heating of the plurality of bare cells.

The battery pack may further include a reinforcement plate arranged on the electrode tab to cover at least the plurality of fuse portions.

The reinforcement plate may include a plurality of holes exposing at least a center portion of the plurality of coupling portions.

According to another aspect of the present disclosure, a battery pack includes: a housing including a first surface and a second surface opposite to the first surface; a first bare cell unit including a plurality of first bare cells accommodated in the housing such that a first electrode terminal is arranged at the first surface; a second bare cell unit arranged adjacent to the first bare cell unit and including a plurality of second bare cells accommodated in the housing such that a second electrode terminal having an opposite polarity to the first electrode terminal is arranged at the first surface; and an electrode tab arranged on the first surface and the second surface to electrically connect the first bare cell unit and the second bare cell unit to each other, wherein the electrode tab includes; a plate including a plurality of opening portions formed corresponding respectively to the plurality of first bare cells and the plurality of second bare cells; a plurality of fuse portions extending from one edge of the plurality of opening portions into the plurality of opening portions; and a plurality of coupling portions bent from the plurality of fuse portions, arranged at a center portion of the plurality of opening portions, and coupled to the first electrode terminal and the second electrode terminal.

The plurality of coupling portions may include a plurality of first coupling portions coupled to the first electrode terminal and a plurality of second coupling portions coupled to the second electrode terminal arranged adjacent to the first electrode terminal.

The plurality of fuse portions may include a plurality of first fuse portions connected to the plurality of first coupling portions and a plurality of second fuse portions connected to the plurality of second coupling portions, and an extension direction of the plurality of first coupling portions from the plurality of first fuse portions may be opposite to an extension direction of the plurality of second coupling portions from the plurality of second fuse portions.

The plurality of first coupling portions may include a plurality of first row coupling portions and a plurality of second row coupling portions arranged in a line in a first direction.

The plurality of fuse portions may include a plurality of first row fuse portions connected to the plurality of first row coupling portions and a plurality of second row fuse portions connected to the plurality of second row coupling portions, and an extension direction of the plurality of first row fuse portions into the plurality of opening portions may be opposite to an extension direction of the plurality of second row fuse portions into the plurality of opening portions.

The first bare cell unit and the second bare cell unit may be connected in series.

The present disclosure may include various embodiments and modifications, and certain embodiments thereof are illustrated in the drawings and will be described herein in detail. However, it will be understood that the present disclosure is not limited to the embodiments and includes all modifications, equivalents, and substitutions falling within the spirit and scope of the present disclosure. In the following description of the present disclosure, certain detailed descriptions of the related art will be omitted when it is deemed that they may unnecessarily obscure the subject matters of the present disclosure.

Although terms such as "first" and "second" may be used herein to describe various elements or components, these elements or components should not be limited by these terms. These terms are only used to distinguish one element or component from another element or component.

It will be understood that when an element such as a layer, a film, a region, or a plate is referred to as being "on" another element, it may be "directly on" or "indirectly on" the other element with one or more other elements therebetween.

As used herein, the x-axis, the y-axis, and the z-axis are not limited to three axes of the rectangular coordinate system, and may be interpreted in a broader sense. For example, the x axis, the y axis, and the z axis may be perpendicular to each other, or may represent different directions that are not perpendicular to each other.

Hereinafter, embodiments of the present disclosure will be described in detail with reference to the accompanying drawings, and in the following description, like reference numerals will be used to denote like elements and redundant descriptions thereof will be omitted for conciseness. In the drawings, thicknesses are enlarged to clearly represent layers and regions. Also, in the drawings, the thicknesses of some layers and regions are exaggerated for convenience of description.

Figure 1:
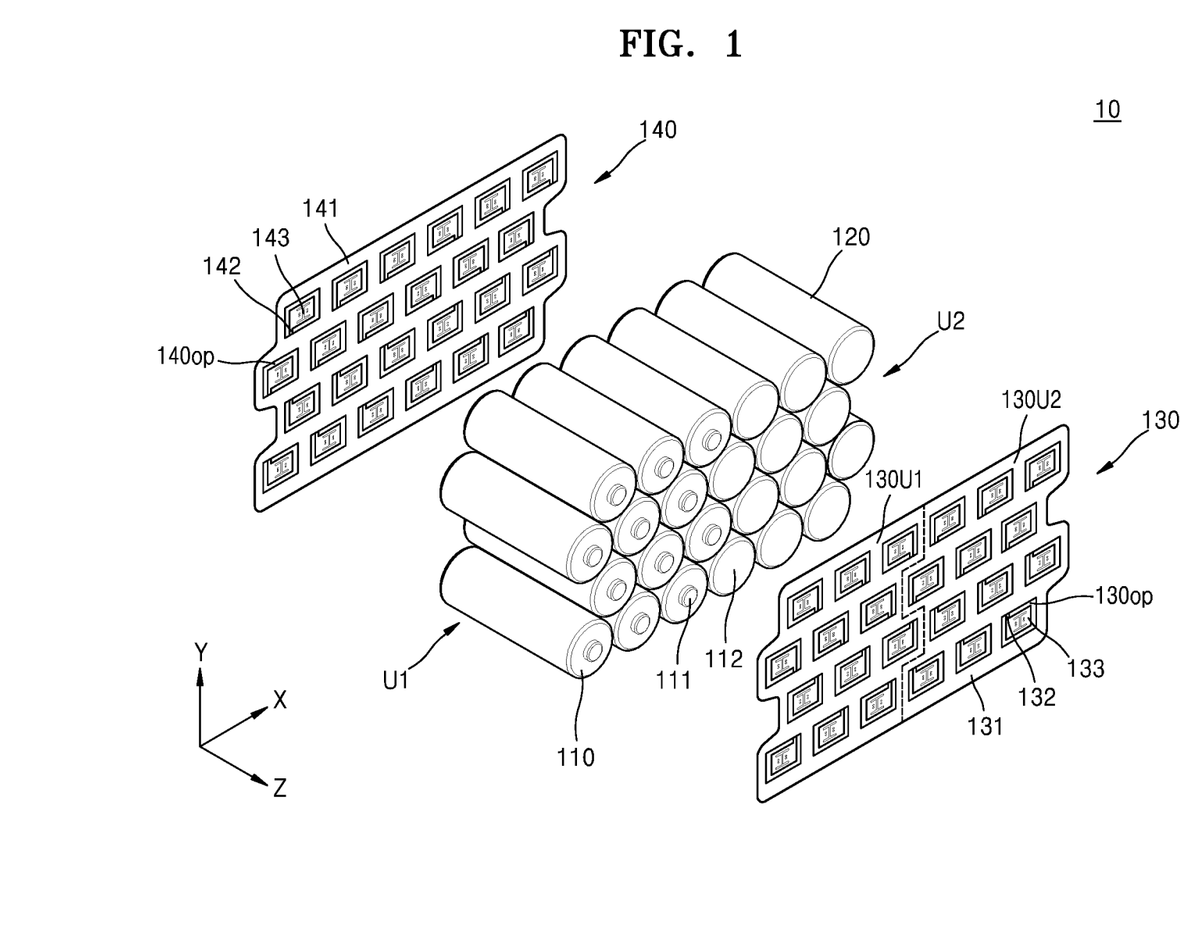
FIG. 1 is an exploded perspective view schematically illustrating a battery pack according to an embodiment of the present disclosure.

FIG. 1 is an exploded perspective view schematically illustrating a battery pack according to an embodiment of the present disclosure.

Figure 2:
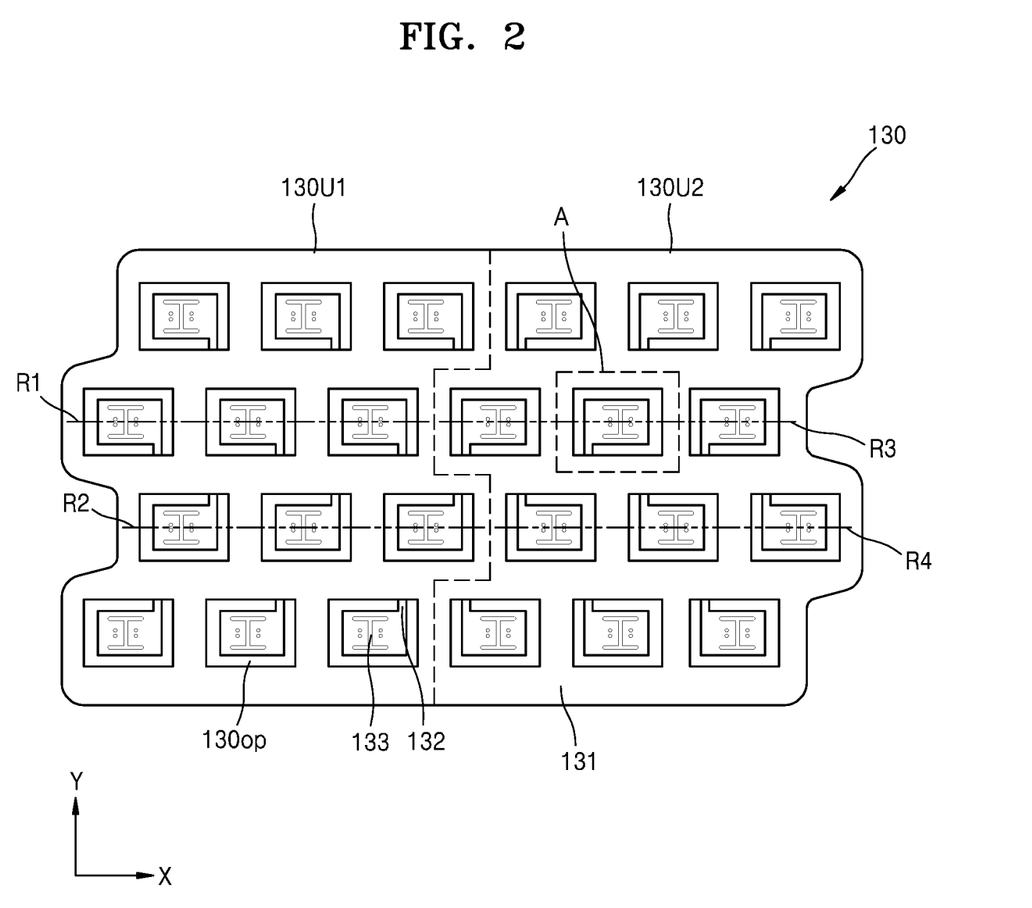
FIG. 2 is a plan view schematically illustrating some components of the battery pack of FIG. 1.

Referring to FIGS. 1 and 2, a battery pack 10 according to an embodiment of the present disclosure may include a plurality of bare cells 110 and electrode tabs 130 and 140.

In this case, the bare cells 110 may be a secondary battery that is rechargeable, for example, a lithium ion battery or a lithium polymer battery. The bare cells 110 may be connected to an external terminal to receive charge power and output discharge power.

The bare cells 110 may be accommodated in a housing 120. Particularly, the bare cells 110 may be inserted into the housing 120 in the z-axis direction. For this purpose, the housing 120 may be provided with an internal space corresponding to the shape of the bare cell 110. In this case, in order to prevent the bare cells 110 from moving in the internal space of the housing 120, a case (not illustrated) surrounding the bare cells 110 inserted into the housing 120 may be further provided.

The bare cells 110 may be connected in series or in parallel to each other, and the rated charge voltage and charge capacity may be adjusted by combining these serial/parallel connections.

Particularly, the bare cell 110 may include a first electrode terminal 111 and a second electrode terminal 112 having opposite polarities, and the electrode terminals 111 and 112 may form an electrical connection for outputting the discharge power stored in the bare cell 110 or receiving the charge power supplied from the outside. Although not illustrated in FIG. 1 or the like, in the bare cell 110, a stack-type electrode assembly including a positive electrode plate and a negative electrode plate connected to the first electrode terminal 111 and the second electrode terminal 112 and a separator located between the positive electrode plate and the negative electrode plate, or a roll-type electrode assembly including a positive electrode plate and a negative electrode plate connected to the first electrode terminal 111 and the second electrode terminal 112 and a separator wound in the form of a jelly roll may be accommodated.

The first electrode terminal 111 may be provided at one end of the bare cell 110 to form a first polarity, and the second electrode terminal 112 may be provided at the other end of the bare cell 110 to form a second polarity. In this case, the first polarity may be a positive polarity or a negative polarity, and the second polarity may be a negative polarity or a positive polarity opposite to the first polarity. Hereinafter, for convenience of description, a description will be mainly given of a case where the first polarity is a positive polarity and the second polarity is a negative polarity.

The bare cells 110 may be accommodated in the housing 120, and the bare cells 110 may be inserted into the housing 120 such that both ends thereof may be respectively arranged at a first surface and a second surface of the housing 120. In this case, the bare cells 110 may be divided into a plurality of bare cell units.

In an embodiment, the bare cells 110 may be configured as a first bare cell unit U1 and a second bare cell unit U2. Particularly, as for the first bare cell unit U1, a plurality of bare cells 110 may be arranged in the housing 120 such that the first electrode terminal 111 may be arranged at the first surface of the housing 120 and the second electrode terminal 112 may be arranged at the second surface of the housing 120. Hereinafter, for convenience of description, the bare cell 110 constituting the first bare cell unit U1 will be referred to as a first bare cell.

Also, as for the second bare cell unit U2, a plurality of bare cells 110 may be arranged in the housing 120 such that the second electrode terminal 112 may be arranged at the first surface of the housing 120 and the first electrode terminal 111 may be arranged at the second surface of the housing 120. Hereinafter, for convenience of description, the bare cell 110 constituting the second bare cell unit U2 will be referred to as a second bare cell.

However, the number of bare cells 110 constituting each bare cell unit and the number of bare cell units are not limited to particular numbers and may be selected as various numbers according to operating conditions and operation environments of the battery pack 10. However, hereinafter, for convenience of description, a description will be mainly given of a case where each bare cell unit includes 12 bare cells 110 and the battery pack 10 includes two bare cell units U1 and U2.

The electrode tabs 130 and 140 may be respectively arranged at both ends of the bare cells 110. Particularly, the electrode tabs 130 and 140 may include a first electrode tab 130 and a second electrode tab 140, wherein the first electrode tab 130 may be coupled to the first electrode terminal 111 and the second electrode terminal 112 arranged at the first surface of the housing 120 and the second electrode tab 140 may be coupled to the first electrode terminal 111 and the second electrode terminal 112 arranged at the second surface of the housing 120. Accordingly, the electrode tabs 130 and 140 may electrically connect adjacent bare cells 110 to each other, and the connected bare cells 110 may be connected to an external terminal (not illustrated) to receive the charge power and output the discharge power. Also, the electrode tabs 130 and 140 may be connected to a protection circuit module (not illustrated) such that the charge and discharge operation of the bare cells 110 may be suitably controlled by the protection circuit module.

The electrode tabs 130 and 140 may connect the bare cells 110 constituting each of the bare cell units U1 and U2 in parallel.

As an example, the first electrode tab 130 may include a first region 130U1 and a second region 130U2. Particularly, the first region 130U1 may be a portion connecting the bare cells 110 constituting the first bare cell unit U1 in parallel to each other, and the second region 130U2 may be a portion connecting the bare cells 110 constituting the second bare cell unit U2 in parallel to each other. As such, by connecting the bare cells 110 constituting each of the bare cell units U1 and U2 in parallel, it may be possible to increase the life of the battery pack 10 and increase the current amount thereof.

Also, the electrode tabs 130 and 140 may connect any one of the bare cell units U1 and U2 in series to another bare cell unit. That is, the first bare cell unit U1 and the second bare cell unit U2 may be connected in series to each other.

As an example, as for the first electrode tab 130, as the first region 130U1 and the second region 130U2 are connected, the first bare cell unit U1 and the second bare cell unit U2 may be connected in series to each other. In this case, the first region 130U1 and the second region 130U2 may be integrally formed as illustrated in FIG. 1 or the like or may be connected by using a separate conductive connection member.

As such, the voltage amount thereof may be increased by connecting a plurality of bare cell units in series to each other. That is, a voltage suitable for the purpose of use of the battery pack 10 may be generated. Particularly, a high voltage should be instantaneously generated in the case of a spark plug or a driving plug of a driving device, and in this case, a high voltage may be formed by connecting a plurality of bare cell units in series to each other.

Meanwhile, the first electrode tab 130 and the second electrode tab 140 may respectively include plates 131 and 141, a plurality of fuse portions 132 and 142, and a plurality of coupling portions 133 and 143. That is, the first electrode tab 130 and the second electrode tab 140 may have the same or similar structure, and thus, hereinafter, for convenience of description, the structure of an electrode tab will be described in detail with respect mainly to the first electrode tab 130 and the term "electrode tab" will be generically used instead of "first electrode tab".

Figure 3:
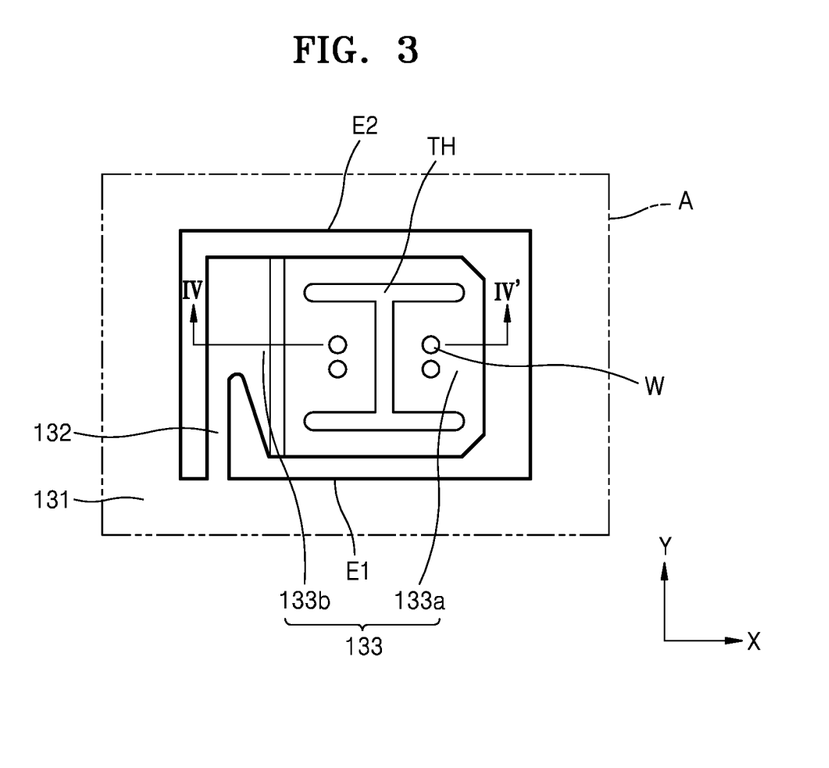
FIG. 3 is a plan view schematically illustrating a region A of FIG. 2.
Figure 4:
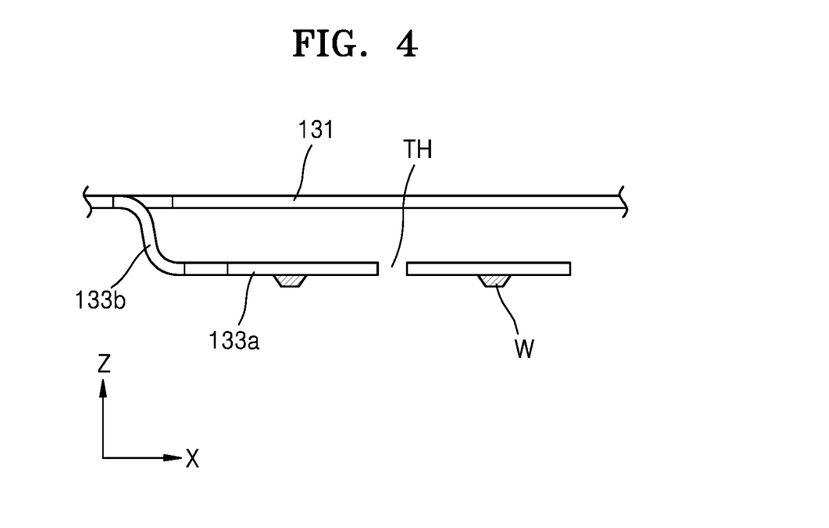
FIG. 4 is a cross-sectional view taken along line IV-IV' of FIG. 3.

FIG. 2 is a plan view schematically illustrating some components of the battery pack of FIG. 1, FIG. 3 is a plan view schematically illustrating a region A of FIG. 2, and FIG. 4 is a cross-sectional view taken along line IV-IV' of FIG. 3.

Referring to FIGS. 2 to 4, the electrode tab 130 may include a plate 131, a plurality of fuse portions 132, and a plurality of coupling portions 133.

The plate 131 may be a portion arranged to cover one surface of a plurality of bare cells and may include a plurality of opening portions 130op formed corresponding respectively to the bare cells.

In an embodiment, the bare cells may be arranged in a line in a first direction (+x direction), and thus, the opening portions 130op may be arranged in a line in the first direction (+x direction) corresponding respectively to the bare cells.

The coupling portions 133 may be provided at a center portion of the opening portions 130op, and the fuse portions 132 may be arranged between the edges of the coupling portions 133 and the opening portions 130op.

The fuse portions 132 may be a portion fused by heating of the bare cells and may be to prevent an overcurrent from flowing into the other bare cells when a short circuit occurs in any one of the bare cells. For this purpose, the fuse portions 132 may be formed of a relatively thin member to be easily melted.

Also, the fuse portion 132 may extend from one edge E1 of the opening portion 130op into the opening portion 130op as illustrated in FIG. 3, and in this case, the extension direction of the fuse portion 132 may be a second direction (+y direction) intersecting the first direction (+x direction), and in an embodiment, the second direction (+y direction) may be substantially perpendicular to the first direction (+x direction).

As such, because the fuse portion 132 extends in the second direction (+y direction) intersecting the first direction (+x direction) in which the opening portions 130op are arranged in a line, the mechanical disconnection of the fuse portion 132 may be minimized. For example, when the relatively thin fuse portion 132 extends in the first direction (+x direction), the first direction (+x direction) may be the long-side direction of the electrode tab 130, which is subject to deformation such as bending, and accordingly, the fuse portion 132 may be more easily disconnected due to the bending. Thus, forming the fuse portion 132 to extend in the second direction (+y direction), which is less vulnerable to bending or the like than the first direction (+x direction), may be a method of preventing disconnection of the fuse portion 132.

The coupling portions 133 may be connected to the fuse portions 132. Particularly, the coupling portions 133 may be bent from the fuse portions 132 to be located at the center portion of the opening portions 130op as described above.

The coupling portions 133 may include a welding region 133a and a connection region 133b. The welding region 133a may be a region welded to an electrode terminal of the bare cell and may be formed to be substantially flat to contact one surface of the electrode terminal.

A welding point W may be provided in the welding region 133a. As illustrated in FIG. 4, the welding point W may be formed to protrude in the −z direction, which is a direction toward the bare cell, to directly contact the electrode terminal of the bare cell, and a welding rod may be arranged over the welding point W such that the welding point W may be joined to the electrode terminal of the bare cell by a welding current flowing through the welding rod. That is, the welding point W may function as a reference point for a welding operation and may guide the welding rod to a certain position of each of the bare cells.

A through hole TH may be formed around the welding point W, and the through hole TH may function to absorb a thermal expansion caused by heat generated in a welding operation. The through hole TH may be generally formed larger than the welding point W, thereby minimizing the thermal expansion.

The welding region 133a may be formed to have a polygonal shape as illustrated in FIG. 2 or the like; however, the present disclosure is not limited thereto and the welding region 133a may be formed to have a shape similar to a cross-section of the bare cell coupled to the welding region 133a. For example, when the bare cell is a cylindrical battery, the welding region 133a may be formed in a circular (or elliptical) shape.

The connection region 133b may be connected to the welding region 133a. Particularly, the connection region 133b may be a portion arranged between the fuse portion 132 and the welding region 133a to connect the connection region 133b to the fuse portion 132 and may be formed to be bent in the −z direction, which is a direction from the fuse portion 132 toward the bare cell, as illustrated in FIG. 4.

Because the connection region 133b is bent in the −z direction, the welding region 133a may be located at a different height than the plate 131 as illustrated in FIG. 4. Considering that the welding point W of the welding region 133a is joined to an electrode terminal of the bare cell, the height of the welding region 133a from the electrode terminal may be smaller than the height of the plate 131 from the electrode terminal. In this case, because the fuse portion 132 connecting the connection region 133b to the plate 131 may be formed at substantially the same height as the plate 131, the height of the welding region 133a from the electrode terminal may be smaller than the height of the fuse portion 132 from the electrode terminal.

As such, because a plurality of connection regions 133b connected to the fuse portions 132 are bent such that the fuse portions 132 and the coupling portions 133 may be located at different heights, the connection regions 133b may function as an elastic member such as a spring. Thus, because the connection regions 133b may perform as a buffering operation or the like, it may be possible to minimize the mechanical disconnection of the fuse portions 132 formed thin to be easily fused by a short circuit. In addition, it may be possible to reduce the risk of deformation and breakage of the coupling portions 133 in an operation of transporting or assembling the battery pack.

Meanwhile, referring to FIG. 2 together with FIG. 1, as described above, the first region 130U1 of the electrode tab 130 may be connected to the first electrode terminal 111 provided in the first bare cell unit U1 and the second region 130U2 of the electrode tab 130 may be connected to the second electrode terminal 112 provided in the second bare cell unit U2.

In this case, each of the first region 130U1 and the second region 130U2 of the electrode tab 130 may include a plurality of coupling portions 133 and a plurality of fuse portions 132, and hereinafter, for convenience of description, the coupling portion provided in the region 130U1 will be referred to as a first coupling portion and the coupling portion provided in the second region 130U2 will be referred to as a second coupling portion. In addition, the fuse portion provided in the first region 130U1 will be referred to as a first fuse portion and the fuse portion provided in the second region 130U2 will be referred to as a second fuse portion.

In an embodiment, as illustrated in FIG. 2, the extension direction (−x direction) of the first coupling portion from the first fuse portion in the first region 130U1 may be opposite to the extension direction (+x direction) of the second coupling portion from the second fuse portion in the second region 130U2.

Also, in the first region 130U1, a plurality of first row coupling portions arranged along a first row R1 extending in the first direction (+x direction) may be located, and a plurality of second row coupling portions extending in the first direction (+x direction) and arranged along a second row R2 different from the first row R1 may be located. In this case, when the fuse portion connected to the first row coupling portion is referred to as a first row fuse portion and the fuse portion connected to the second row coupling portion is referred to as a second row fuse portion, the extension direction (+y direction) of the first row fuse portion located in the first row R1 into the opening portion 130op may be opposite to the extension direction (−y direction) of the second row fuse portion located in the second row R2 into the opening portion 130op.

Likewise, in the second region 130U2, a plurality of third row coupling portions arranged along a third row R3 extending in the first direction (+x direction) may be located, and a plurality of fourth row coupling portions extending in the first direction (+x direction) and arranged along a fourth row R4 different from the third row R3 may be located. In this case, when the fuse portion connected to the third row coupling portion is referred to as a third row fuse portion and the fuse portion connected to the fourth row coupling portion is referred to as a fourth row fuse portion, the extension direction (+y direction) of the third row fuse portion located in the third row R3 into the opening portion 130op may be opposite to the extension direction (−y direction) of the fourth row fuse portion located in the fourth row R4 into the opening portion 130op.

In an embodiment, in the first region 130U1 and the second region 130U2, a plurality of coupling portions 133 may be alternately arranged in a substantially zigzag shape.

As described above, because the extension direction of adjacent coupling portions 133 and the extension direction of adjacent fuse portions 132 are opposite to each other or the adjacent coupling portions 133 and the adjacent fuse portions 132 are alternately arranged, the directions of stresses acting on the electrode tab 130 may be offset to further improve the durability of the electrode tab 130.

Figure 5:
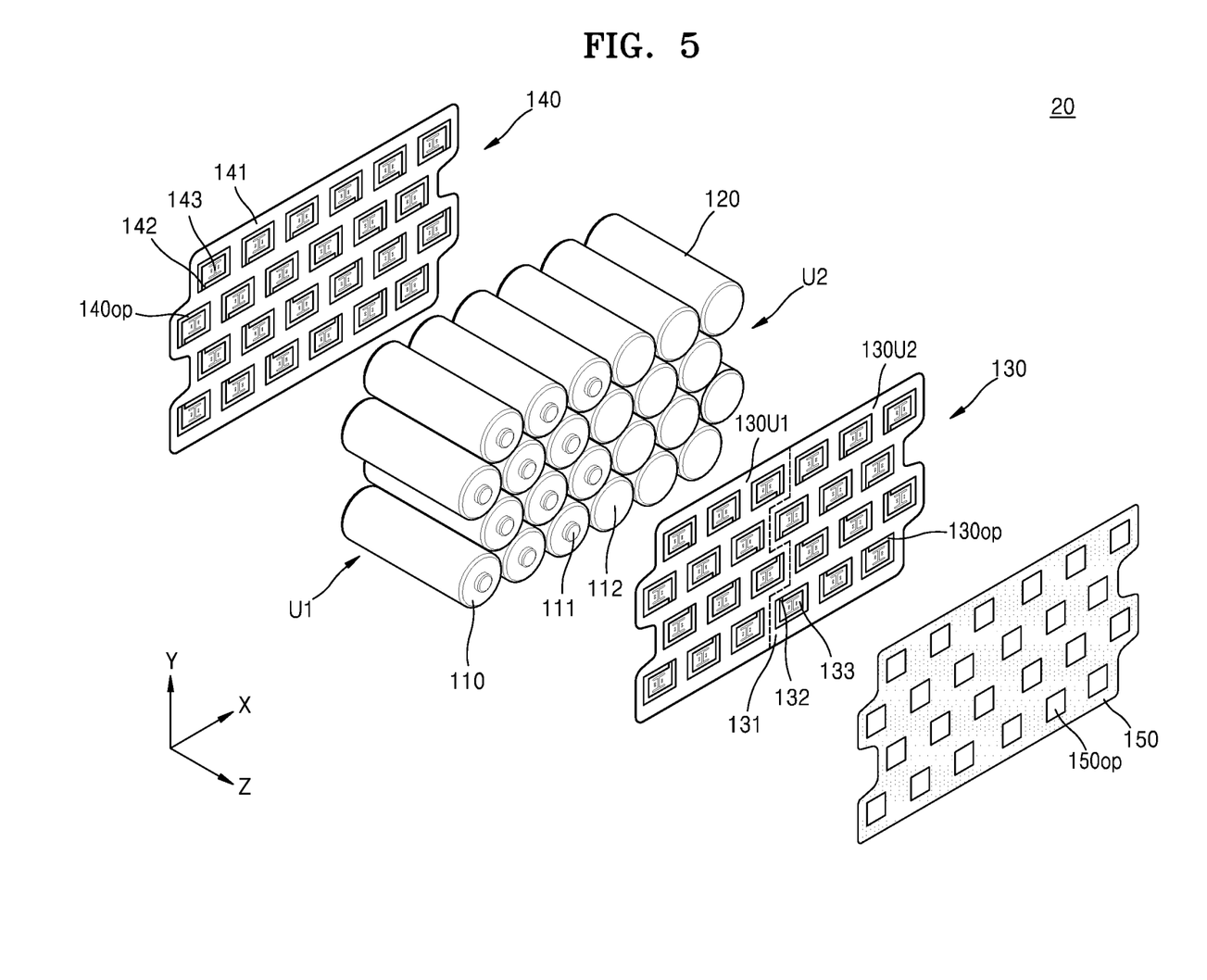
FIG. 5 is an exploded perspective view schematically illustrating a battery pack according to another embodiment of the present disclosure.
Figure 6:
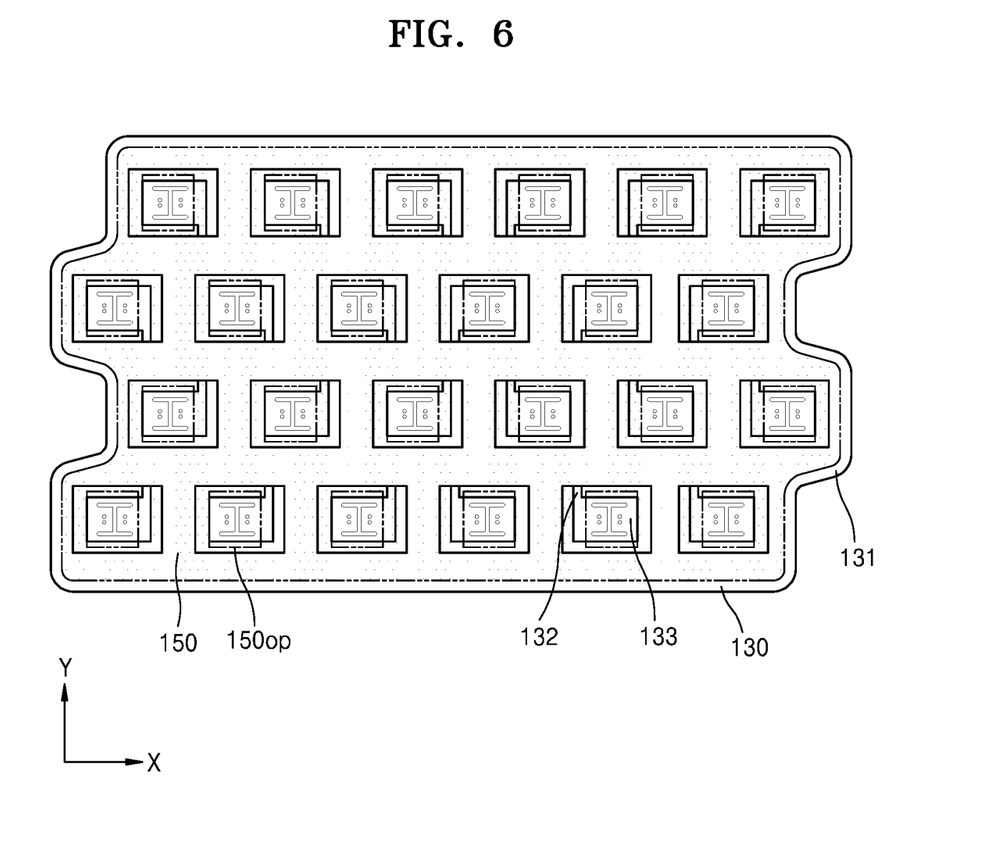
FIG. 6 is a plan view schematically illustrating some components of the battery pack of FIG. 5.

FIG. 5 is an exploded perspective view schematically illustrating a battery pack according to another embodiment of the present disclosure, and FIG. 6 is a plan view schematically illustrating some components of the battery pack of FIG. 5.

Referring to FIGS. 5 and 6, a battery pack 20 according to another embodiment of the present disclosure may include a plurality of bare cells 110, electrode tabs 130 and 140, and a reinforcement plate 150. The structures of the bare cell 110 and the electrode tabs 130 and 140 of the present embodiment may be identical or similar to those of the embodiment and modifications thereof described with reference to FIG. 1 and the like. Thus, the description of the bare cell 110 and the electrode tabs 130 and 140 will be replaced with the above description, and the structure of the reinforcement plate 150 will be mainly described below.

The reinforcement plate 150 may be arranged on the electrode tab 130, and accordingly, the battery pack 20 may have a structure in which the electrode tab 130 is located between the bare cells 110 and the reinforcement plate 150.

The reinforcement plate 150 may be a member for reinforcing the durability of the electrode tab 130, and the reinforcement plate 150 may be arranged to cover at least the fuse portion 132 that is a vulnerable portion in the electrode tab 130.

In this case, the reinforcement plate 150 may include a plurality of holes 150op for exposing at least a center portion of the coupling portions 133 such that a weld-coupling may be formed between the coupling portions 133 and the bare cells 110. Accordingly, a welding rod may be guided to a welding point on the coupling portions 133 exposed through the holes 150op, to join the coupling portions 133 to the electrode terminal of the bare cells 110.

The reinforcement plate 150 may be formed in various shapes; however, the reinforcement plate 150 may be formed in a thin film shape to adhere onto the electrode tab 130 and the reinforcement plate 150 may be, for example, a reinforcement tape having an adhesive property.

Although FIG. 5 illustrates that the reinforcement plate 150 is arranged only on the first electrode tab 130, the present disclosure is not limited thereto and the reinforcement plate 150 may also be arranged on the second electrode tab 140. In this case, the battery pack 20 may have a structure in which the second electrode tab 140 is located between the reinforcement plate 150 and the bare cells 110.

According to an embodiment of the present disclosure described above, the stability of the battery pack may be improved by minimizing the influence such as a short circuit between adjacent battery cells. Also, the risk of deformation or breakage of components may be reduced when the battery pack is transported or assembled.

Although the present disclosure has been described with reference to the embodiments illustrated in the drawings, this is merely an example and those of ordinary skill in the art will understand that various modifications may be made therein. Thus, the spirit and scope of the present disclosure should be defined by the appended claims.

According to an embodiment of the present disclosure, a battery pack capable of improving the stability thereof by minimizing the influence between adjacent battery cells may be provided, and the battery pack may be used as an energy source for mobile devices, electric vehicles, hybrid vehicles, or other electric devices and may be used in various forms depending on the types of external devices to which the battery pack is applied.

The invention claimed is:

1. A battery pack comprising:
   a plurality of bare cells including an electrode terminal at both ends thereof; and
   an electrode tab arranged at each of the both ends along a first direction to electrically connect adjacent bare cells to each other; and
   an H-shaped through hole formed in a welding region,
   wherein the electrode tab includes:
   a plate including a plurality of opening portions disposed along the first direction and formed corresponding respectively to the plurality of bare cells;
   a plurality of fuse portions extending from one edge of the plurality of opening portions into the plurality of opening portions, the plurality of fuse portions respectively disposed inside the plurality of opening portions and extending along a second direction orthogonal to the first direction; and
   a plurality of coupling portions bent from the plurality of fuse portions, arranged at a center portion of the plurality of opening portions, and coupled to the electrode terminal,
   wherein the plurality of coupling portions include the welding region welded to the electrode terminal and a connection region bent from the plurality of fuse portions and connected to the welding region, and
   wherein a height of the welding region from the electrode terminal is smaller than a height of the plurality of fuse portions from the electrode terminal,
   the battery pack further comprising:
   a plurality of welding points formed adjacent to the through hole in the welding region, in which a first pair of welding points are formed on one side of the through hole separated from a second pair of welding points formed on an opposite side of the through hole, the plurality of welding points extending from the welding region in a third direction perpendicular to both the first direction and to the second direction.

2. The battery pack of claim 1, wherein a height of the welding region from the electrode terminal is smaller than a height of the plate from the electrode terminal.

3. The battery pack of claim 1, wherein the plurality of opening portions are arranged in a line in a first direction, and
   the plurality of fuse portions extend in a second direction intersecting the first direction.

4. The battery pack of claim 3, wherein the second direction is perpendicular to the first direction.

5. The battery pack of claim 1, wherein the plurality of fuse portions are fused by heating of the plurality of bare cells.

6. The battery pack of claim 1, further comprising a reinforcement plate arranged on the electrode tab to cover at least the plurality of fuse portions.

7. The battery pack of claim 6, wherein the reinforcement plate includes a plurality of holes exposing at least a center portion of the plurality of coupling portions.

8. The battery pack of claim 1, wherein the welding region has a polygonal shape.

9. The battery pack of claim 1, wherein each of the plurality of opening portions forms a substantially rectangular shape with a respective one of the plurality of fuse portions formed at one corner of the substantially rectangular shape.

* * * * *